United States Patent
Okazaki

(10) Patent No.: US 11,674,864 B2
(45) Date of Patent: Jun. 13, 2023

(54) WATER LEAKAGE DETECTION DEVICE

(71) Applicant: ABLIC Inc., Tokyo (JP)

(72) Inventor: Norihiro Okazaki, Tokyo (JP)

(73) Assignee: ABLIC INC., Tokyo (JP)

( * ) Notice: Subject to any disclaimer, the term of this patent is extended or adjusted under 35 U.S.C. 154(b) by 125 days.

(21) Appl. No.: 17/175,016

(22) Filed: Feb. 12, 2021

(65) Prior Publication Data

US 2021/0262887 A1   Aug. 26, 2021

(30) Foreign Application Priority Data

Feb. 21, 2020 (JP) .............................. JP2020-027760

(51) Int. Cl.
   *G01M 3/18*   (2006.01)
   *G08B 21/20*   (2006.01)

(52) U.S. Cl.
   CPC ............. *G01M 3/182* (2013.01); *G08B 21/20* (2013.01)

(58) Field of Classification Search
   CPC ........ G01M 3/182; G01M 3/165; G01M 3/16; G08B 21/20; G08B 25/10
   See application file for complete search history.

(56) References Cited

U.S. PATENT DOCUMENTS

| | | | | |
|---|---|---|---|---|
| 4,266,195 A * | 5/1981 | Keefner | ................. | G01R 27/02 324/439 |
| 5,188,143 A * | 2/1993 | Krebs | .................... | G01M 3/16 126/388.1 |
| 6,414,598 B2 * | 7/2002 | Freill | ..................... | G01F 23/36 340/636.15 |
| 7,239,246 B2 * | 7/2007 | Picco | ..................... | G01M 3/18 73/725 |
| 2006/0244616 A1 * | 11/2006 | Hill | ....................... | G01M 3/045 359/512 |
| 2009/0284382 A1 * | 11/2009 | Hill | ....................... | G01M 3/165 340/604 |

FOREIGN PATENT DOCUMENTS

| | | | | |
|---|---|---|---|---|
| CN | 106557056 B | * | 11/2018 | .......... G05B 19/048 |
| JP | H03267732 A | * | 11/1991 | |
| JP | 2001296201 A | * | 10/2001 | |
| JP | 2006-053057 A | | 2/2006 | |
| JP | 2008233031 A | * | 10/2008 | |
| JP | 2013167551 A | * | 8/2013 | |

OTHER PUBLICATIONS

JP2001296201A Description Translation (Year: 2001).*
CN106557056A Description Translation (Year: 2017).*

* cited by examiner

*Primary Examiner* — Yoshihisa Ishizuka
*Assistant Examiner* — Christopher J Gassen
(74) *Attorney, Agent, or Firm* — Crowell & Moring LLP

(57) ABSTRACT

Provided is a water leakage detection device, including: a pair of metal electrodes containing a first end and a second end; a warning device connected to the first end of the pair of metal electrodes, and configured to issue a warning based on a potential difference between the pair of metal electrodes; and a power supply which is connected to the second end of the pair of metal electrodes, and configured to apply a voltage between the pair of metal electrodes.

9 Claims, 2 Drawing Sheets

WATER LEAKAGE DETECTION DEVICE

RELATED APPLICATIONS

This application claims priority to Japanese Patent Application No. 2020-027760, filed on Feb. 21, 2020, the entire content of which is incorporated herein by reference.

BACKGROUND OF THE INVENTION

1. Field of the Invention

The present invention relates to a water leakage detection device.

2. Description of the Related Art

Hitherto, there has been known a water leakage detection device configured to issue a warning of the occurrence of water leakage, based on power generated due to the water leakage. Specifically, there has been proposed a water leakage detection device utilizing an electromotive force which is generated between different types of metals having different standard electrode potentials each other if moisture penetrates between the different types of metals (see, for example, Japanese Patent Application Laid-open No. 2006-53057).

A conventional water leakage detection device such as the water leakage detection device disclosed in Japanese Patent Application Laid-open No. 2006-53057 is required to detect emergency water leakage without fail, and thus is required to be inspected regularly. It is therefore required to secure enough personnel or the like for the regular inspection.

SUMMARY OF THE INVENTION

According to one embodiment of the present invention, there is provided a water leakage detection device, including: a pair of metal electrodes containing a first end and a second end; a warning device connected to the first end of the pair of metal electrodes, and configured to issue a warning based on a potential difference between the pair of metal electrodes; and a power supply which is connected to the second end of the pair of metal electrodes, and configured to apply a voltage between the pair of metal electrodes.

According to the one embodiment of the present invention, automatic operation check is performed regularly, and hence the personnel or the like for regular inspection, for example, becomes unnecessary.

DETAILED DESCRIPTION OF THE PREFERRED EMBODIMENTS

First Embodiment

Figure 1:
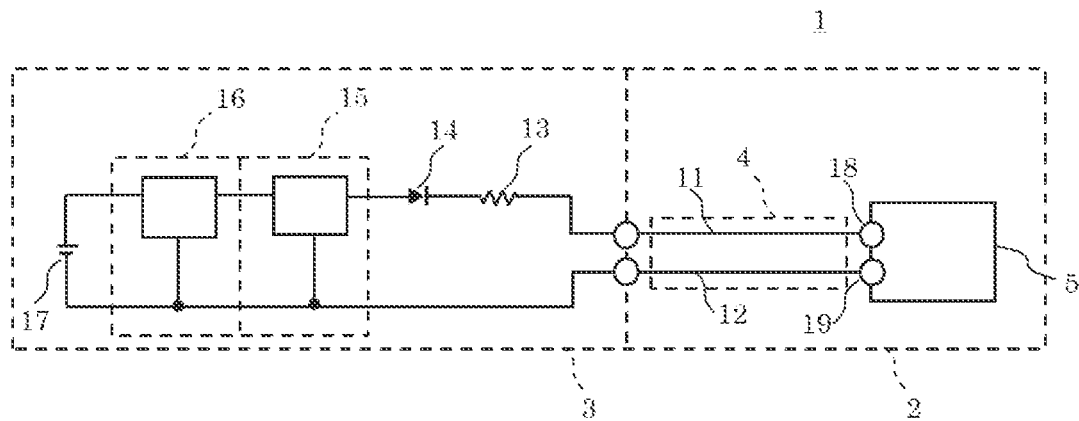
FIG. 1 is a schematic diagram for illustrating an example of a water leakage detection device according to a first embodiment of the present invention.

Now, a first embodiment of the present invention is described below with reference to the drawings. FIG. 1 is a schematic diagram for illustrating a water leakage detection device 1 serving as an example of a water leakage detection device according to the first embodiment.

The water leakage detection device 1 includes a water leakage warning device 2 and a self-diagnosis power supply 3 serving as a power supply. The water leakage warning device 2 includes a water leakage detection circuit 5 and a sensor 4. The sensor 4 includes a pair of metal electrodes which are a first electrode 11 and a second electrode 12. The self-diagnosis power supply 3 includes a resistor 13, a diode 14, a constant voltage regulator 15, a timer 16, and a battery 17.

The battery 17 being a constant voltage source is connected to the timer 16, and is configured to supply DC current to the timer 16.

The timer 16 is connected to the constant voltage regulator 15, and is set to supply the current from the battery 17 to the constant voltage regulator 15 regularly at a predetermined time for a preset period of time.

The constant voltage regulator 15 is connected to the first electrode 11 and the second electrode 12 via the diode 14 and the resistor 13. The constant voltage regulator 15 receives the current from the timer 16, and then supplies current at a preset voltage to the sensor 4 via the diode 14 and the resistor 13. The diode 14 is inserted so as to prevent the current from flowing back from the resistor 13 to the constant voltage regulator 15. It is desired that the diode 14 cause less reverse leakage current. For example, a Zener diode having a Zener voltage higher than the applied voltage is used as the diode 14. As the constant voltage regulator 15, a three-terminal step-down series regulator is used. However, a step-up constant voltage regulator configured by a DC/DC converter may be used depending on the voltage of the battery 17.

The sensor 4 has a first end and a second end. The first and the second electrodes 11 and 12 of the sensor 4 are connected to the water leakage detection circuit 5 at the first end, and are connected to the self-diagnosis power supply 3 at the second end.

The first electrode 11 contains a first metal. The second electrode 12 contains a second metal of which standard electrode potential is different from that of the first metal. That is, the first electrode 11 and the second electrode 12 contain different types of metals having different standard electrode potentials each other. The first electrode 11 and the second electrode 12 may be metal conductors being each the metal, conductors having each the metal plated on the surfaces thereof, or conductors having each the metal deposited on the surfaces thereof made of non-conductive fibers as a supporter. In example of the first and the second electrodes 11 and 12 which are conductors having each the metal deposited on the surfaces thereof made of non-conductive fibers, the sensor 4 has more flexible than other examples of the first and the second electrodes 11 and 12. As the different types of metals having different standard electrode potentials each other, for example, a combination of zinc and silver is conceivable. The different types of metals are not limited to the above-mentioned combination, and may be any other combination of metals having different standard electrode potentials each other. The sensor 4 is configured to input to the water leakage detection circuit 5 an electrode potential difference between the first electrode 11 and the second electrode 12.

The water leakage detection circuit 5 has a first input terminal 18 and a second input terminal 19. At the first end of the sensor 4, the first electrode 11 is connected to the first input terminal 18, and is the second input terminal 19.

Now, an operation of the water leakage detection device 1 is described. The sensor 4 is placed at a target portion for water leakage detection. For example, the sensor 4 is formed into an elongated tape shape and wound around a connection portion of a water pipe in a building, for example.

If water leakage occurs at the connection portion of the water pipe, and moisture penetrates between the first electrode 11 and the second electrode 12 of the sensor 4, the sensor 4 exhibits a potential difference that occurs due to an electromotive force resulting from a difference in standard electrode potential between the first electrode 11 and the second electrode 12. The potential difference having occurred in the sensor 4 is input to the water leakage detection circuit 5 via the first input terminal 18 and the second input terminal 19 based upon the potential difference between the first input terminal 18 and the second input terminal 19. If an amount of electricity input to the water leakage detection circuit 5 exceeds a preset value of the amount of electricity, the water leakage detection circuit 5 issues a warning of the occurrence of water leakage.

The self-diagnosis power supply 3 is connected to the second end of the sensor 4. The self-diagnosis power supply 3 is configured to supply the current from the battery 17 to the water leakage detection circuit 5 via the sensor 4 regularly at a predetermined time for a preset period of time through use of the timer 16. The predetermined time is, for example, 2 a.m., and the preset period of time is, for example, 300 seconds.

The water leakage detection circuit 5 is configured to determine the current regularly input at the predetermined time as the current supplied from the self-diagnosis power supply 3, not as a sign of the occurrence of water leakage. In this case, the water leakage detection circuit 5 does not issue a warning. Further, during a time period in which the current is regularly input at the predetermined time, the water leakage detection circuit 5 shows an indication that the water leakage detection device 1 is in a normally operating state.

Further, in such a case that the current supplied from the self-diagnosis power supply 3 is not input for the preset period of time at the predetermined time, the water leakage detection circuit 5 determines the above as a sign of the occurrence of an abnormality in the self-diagnosis power supply 3 or the sensor 4. In this case, the water leakage detection circuit 5 issues a warning of the occurrence of an abnormality. The abnormality in the self-diagnosis power supply 3 is, for example, drain of the battery 17 or a failure of the timer 16. The abnormality in the sensor 4 is, for example, the occurrence of disconnection or short-circuit of the electrode or corrosion of the electrode. Further, in a case where silver is used as an electrode material, an increase in resistance value caused by corrosion of a silver electrode or by generation of silver sulfide are another example of the abnormality in the sensor 4.

The water leakage detection device 1 causes the water leakage detection circuit 5 to issue a water leakage warning if water leakage occurs and moisture penetrates in the sensor 4. Further, in the water leakage detection device 1, the self-diagnosis power supply 3 regularly performs self-diagnosis during normal times, and if an abnormality occurs, a warning of the occurrence of an abnormality is issued.

Second Embodiment

Figure 2:
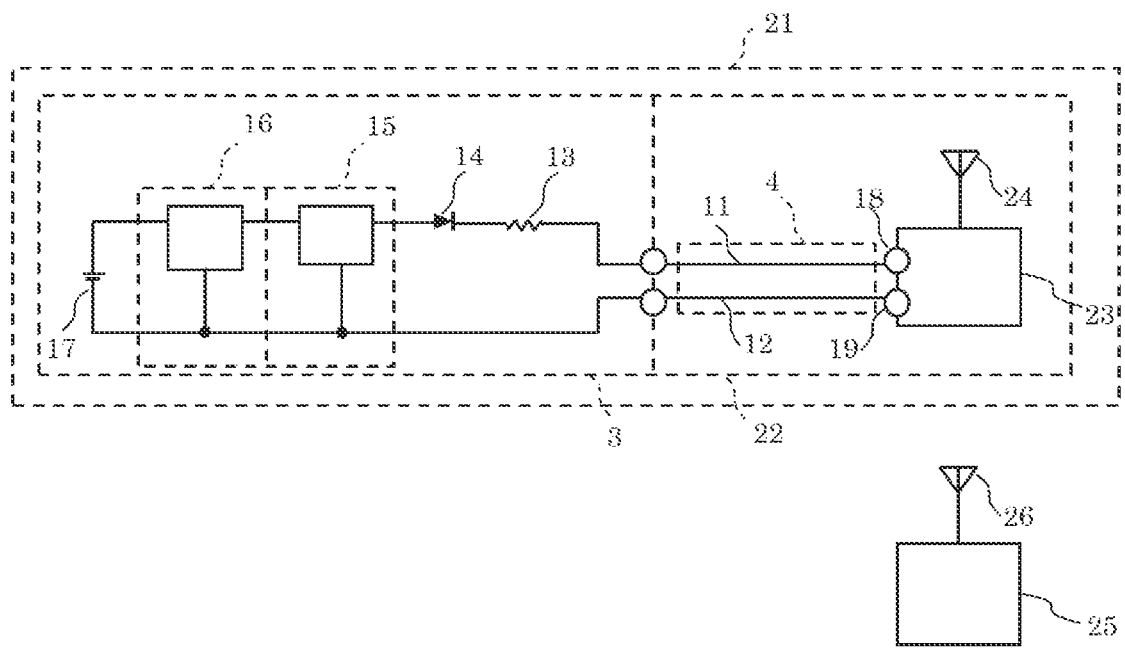
FIG. 2 is a schematic diagram for illustrating an example of a water leakage detection device according to a second embodiment of the present invention.
Figure 3:
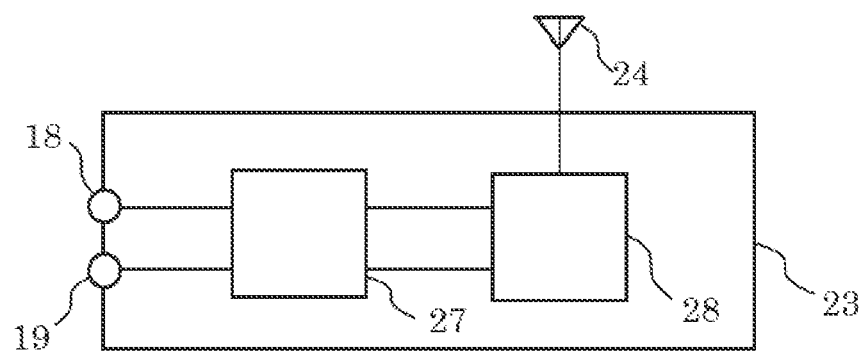
FIG. 3 is a schematic diagram for illustrating an example of a water leakage warning device in the second embodiment of the present invention.

Now, a second embodiment of the present invention is described below with reference to the drawings. FIG. 2 is a schematic diagram for illustrating a water leakage detection device 21 serving as an example of a water leakage detection device according to the second embodiment. FIG. 3 is a schematic diagram for illustrating a water leakage warning device 22 which is an example of a water leakage warning device in the water leakage detection device according to second embodiment. The same components as those of the first embodiment are denoted by the same reference numerals, and description thereof is omitted.

A water leakage detection circuit 23 of the water leakage warning device 22 includes the first input terminal 18, the second input terminal 19, a power storage and voltage boost circuit 27, a wireless transmission circuit 28 configured to operate on a small amount of power, and a transmission antenna 24. The water leakage detection circuit 23 is configured to operate on power supplied from the power storage and voltage boost circuit 27, and thus supply of power from the outside of the water leakage detection device 21 is not required. The first input terminal 18 and the second input terminal 19 are connected to the power storage and voltage boost circuit 27. The power storage and voltage boost circuit 27 is connected to the wireless transmission circuit 28. The wireless transmission circuit 28 is connected to the transmission antenna 24. Further, the water leakage warning device 22 operates as a sub-unit of a water leakage warning device master unit (hereinafter, simply referred to as "master unit") 25 being an external device. The master unit 25 includes a wireless reception circuit (not shown) and a reception antenna 26.

Similarly to the water leakage detection device 1, if moisture penetrates between the first and the second electrodes 11 and 12 of the sensor 4, the water leakage detection device 21 exhibits a potential difference due to an electromotive force resulting from a difference in standard electrode potential between the first and the second electrodes 11 and 12. Current produced by the potential difference having occurred in the sensor 4 is input to the water leakage detection circuit 23 via the first input terminal 18 and the second input terminal 19. The power storage and voltage boost circuit 27 is configured to accumulate, in an internal capacitor thereof, a small amount of electricity input from the first input terminal 18 and the second input terminal 19. Then, if a predetermined amount of electricity set in advance is accumulated in the internal capacitor, the power storage and voltage boost circuit 27 activates an internal voltage boost circuit to supply power to the wireless transmission circuit 28. The wireless transmission circuit 28 receives the power supplied from the power storage and voltage boost circuit 27, and then transmits a water leakage detection signal from the transmission antenna 24. The master unit 25 is configured to receive the water leakage detection signal via the reception antenna 26, and issue a water leakage warning.

Similarly to the first embodiment, the self-diagnosis power supply 3 regularly supplies the current from the battery 17 to the water leakage detection circuit 23 via the sensor 4 at a predetermined time for a preset period of time through use of the timer 16. The predetermined time is, for example, 2 a.m., and the preset period of time is, for example, 300 seconds. The preset period of time is long enough for the power storage and voltage boost circuit 27 to accumulate the predetermined amount of electricity. The water leakage detection circuit 23 receives the current from the self-diagnosis power supply 3, and then transmits a water leakage detection signal. The master unit 25 receives the water leakage detection signal at the predetermined time set in the timer 16 of the water leakage detection device 21, and then determines the received signal as a water leakage detection signal supplied by the operation of the self-diagnosis power supply 3. In this case, the master unit 25 does not issue a water leakage warning. Meanwhile, if the master unit 25 does not receive the water leakage detection signal at the predetermined time, the master unit 25 issues a warning indicating an abnormality in the water leakage detection device 21. During a time period in which current is input regularly at the predetermined time, the master unit 25 shows an indication that the water leakage detection device 21 is in a normally operating state, and further regularly notifies other devices that the water leakage detection device 21 is in a normally operating state.

In this example, the master unit 25 is assumed not to issue a water leakage warning with respect to the water leakage detection signal supplied at the predetermined time. However, the water leakage detection device 21 is not limited to this example. It is also possible to record a time interval of water leakage detection signals obtained in the last self-diagnosis and the self-diagnosis before the last one, and then set water leakage detection signals whose intervals are close to the recorded time interval as the water leakage detection signals obtained by self-diagnosis. In this case, it is possible to appropriately follow even such a case that an operation cycle of the timer 16 varies due to a change in environmental temperature. Further, this case can support even such a case that the operation cycle of the timer 16 is, for example, every 50 hours as well as the case in which the operation cycle is the predetermined time.

In the second embodiment, the description is given of an example in which the water leakage detection device 21 and the master unit 25 communicate each other through use of wireless communication, but the configuration using wired communication may be applicable instead of wireless communication or together with wireless communication.

As described above, according to the water leakage detection device of the present invention, the operation check is regularly and automatically performed. Thus, it is possible to prevent such a situation that the water leakage detection device overlooks water leakage due to its failure. Further, the personnel or the like for regular inspection, for example, is not required. The present invention is not limited to the above-described embodiments, and can be carried out in various forms in addition to the examples described above in the stage of carrying out the invention, and various omissions, replacements, and alterations may be made thereto without departing from the gist of the invention. These embodiments and modifications thereof are encompassed in the scope and the gist of the invention, and are encompassed in the inventions defined in claims and equivalents thereof.

What is claimed is:

1. A water leakage detection device, comprising:
a pair of metal electrodes comprising an elongated first metal electrode and an elongated second metal electrode, the first metal electrode having a first end and a second end opposite the first end of the first metal electrode, and the second metal electrode having a first end and a second end opposite the first end of the first metal electrode;
a warning device connected to the first end of the first metal electrode and the first end of the second metal electrode, and is configured to issue a warning based on a potential difference between the pair of metal electrodes; and
a power supply connected to the second end of the first metal electrode and the second end of the second metal electrode, and is configured to apply a voltage between the pair of metal electrodes;
and wherein the warning device is configured to determine that the warning device has not received a current from the power supply via the pair of metal electrodes and responsively issue a warning regarding an abnormality of the power supply or the pair of metal electrodes.

2. The water leakage detection device according to claim 1, wherein the pair of metal electrodes contain different types of metals having different standard electrode potentials from each other.

3. The water leakage detection device according to claim 1, wherein the power supply includes a resistor, a diode, a constant voltage source, and a timer.

4. The water leakage detection device according to claim 3, wherein the timer is configured to enable the power supply to apply the voltage between the pair of metal electrodes at a predetermined time interval and for a preset period of time.

5. The water leakage detection device according to claim 1, wherein the warning device receives operational power from the power supply via the pair of metal electrodes.

6. The water leakage detection device according to claim 1, wherein the warning device comprises a power storage circuit configured to receive and store power from the power supply received via the pair of metal electrodes.

7. The water leakage detection device according to claim 1, wherein the power supply is configured to apply the voltage between the pair of metal electrodes at a predetermined time interval and for a preset period of time.

8. The water leakage detection device according to claim 7, wherein the warning device is configured to determine that the warning device has not received a current from the power supply via the pair of metal electrodes at the predetermined time interval and/or for the preset period of time and responsively issue a warning regarding an abnormality of the power supply or the pair of metal electrodes.

9. The water leakage detection device according to claim 1, wherein the warning device comprises a wireless transmitter, and wherein the warning device is configured to issue the warning via the wireless transmitter.

\* \* \* \* \*